(12) United States Patent
Barnes et al.

(10) Patent No.: US 11,148,365 B2
(45) Date of Patent: Oct. 19, 2021

(54) REFLECTOR ASSEMBLY WITH PARTIAL ELLIPTICAL CAVITIES

(71) Applicant: HEWLETT-PACKARD DEVELOPMENT COMPANY, L.P., Houston, TX (US)

(72) Inventors: Arthur H Barnes, Vancouver, WA (US); William Winters, Vancouver, WA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 418 days.

(21) Appl. No.: 16/075,213

(22) PCT Filed: Jan. 15, 2017

(86) PCT No.: PCT/US2017/013614
§ 371 (c)(1),
(2) Date: Aug. 3, 2018

(87) PCT Pub. No.: WO2018/132109
PCT Pub. Date: Jul. 19, 2018

(65) Prior Publication Data
US 2019/0039298 A1    Feb. 7, 2019

(51) Int. Cl.
*B29C 64/20* (2017.01)
*B29C 64/205* (2017.01)
(Continued)

(52) U.S. Cl.
CPC .......... *B29C 64/205* (2017.08); *B29C 64/264* (2017.08); *B29C 64/295* (2017.08);
(Continued)

(58) Field of Classification Search
CPC ... B29C 64/205; B29C 64/264; B29C 64/295; G02B 5/26; G02B 5/10; B33Y 30/00; B29K 2105/0032
See application file for complete search history.

(56) References Cited

U.S. PATENT DOCUMENTS

| 4,459,644 A | 7/1984 | Bailly |
| 6,436,485 B1 | 8/2002 | Sedlmeyr |
(Continued)

FOREIGN PATENT DOCUMENTS

| DE | 19947350 C1 | 1/2001 | |
| WO | WO-0124988 A1 * | 4/2001 | ......... B29C 37/0053 |
(Continued)

*Primary Examiner* — Joseph S Del Sole
*Assistant Examiner* — Jamel M Nelson
(74) *Attorney, Agent, or Firm* — HP Inc. Patent Department

(57) ABSTRACT

In one example, a reflector assembly includes a single reflector having at least two elliptical-shaped reflector cavities each with a respective focus point. The shape of the single reflector includes two partial elliptical-shaped reflector cavities having mirror-asymmetric profiles on each end of the single reflector each having a first side extending to a distal end and the first side longer than an opposite second side. The remaining elliptical-shaped reflector cavities have a first side and a second side the same length as the opposite second sides of the two partial elliptical-shaped reflector cavities.

7 Claims, 9 Drawing Sheets

(51) Int. Cl.
*G02B 5/26* (2006.01)
*B33Y 30/00* (2015.01)
*B29C 64/264* (2017.01)
*B29C 64/295* (2017.01)
*B29K 105/00* (2006.01)

(52) U.S. Cl.
CPC ............... *B33Y 30/00* (2014.12); *G02B 5/26* (2013.01); *B29K 2105/0032* (2013.01)

(56) References Cited

U.S. PATENT DOCUMENTS

| | | |
|---|---|---|
| 8,840,235 B2 | 9/2014 | Blessing |
| 8,916,085 B2 | 12/2014 | Jackson et al. |
| 9,099,575 B2 | 8/2015 | Medendorp et al. |
| 2005/0208168 A1* | 9/2005 | Hickerson ............. B29C 64/245 |
| | | 425/174.4 |
| 2012/0138122 A1* | 6/2012 | Whitlock ............ H01L 31/0547 |
| | | 136/246 |
| 2013/0329308 A1* | 12/2013 | Winston ................. G02B 17/08 |
| | | 359/728 |
| 2015/0328719 A1 | 11/2015 | Jarvis et al. |

FOREIGN PATENT DOCUMENTS

| | | | |
|---|---|---|---|
| WO | 2005089463 A2 | 9/2005 | |
| WO | 2016080993 A1 | 5/2016 | |
| WO | WO-2016080993 A1 * | 5/2016 | ............. B33Y 10/00 |

* cited by examiner

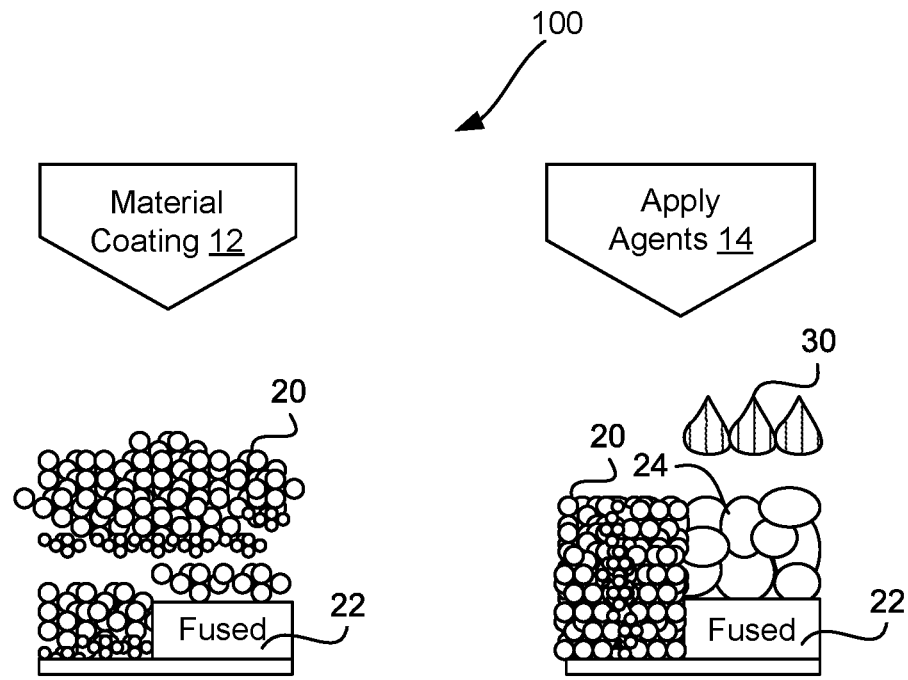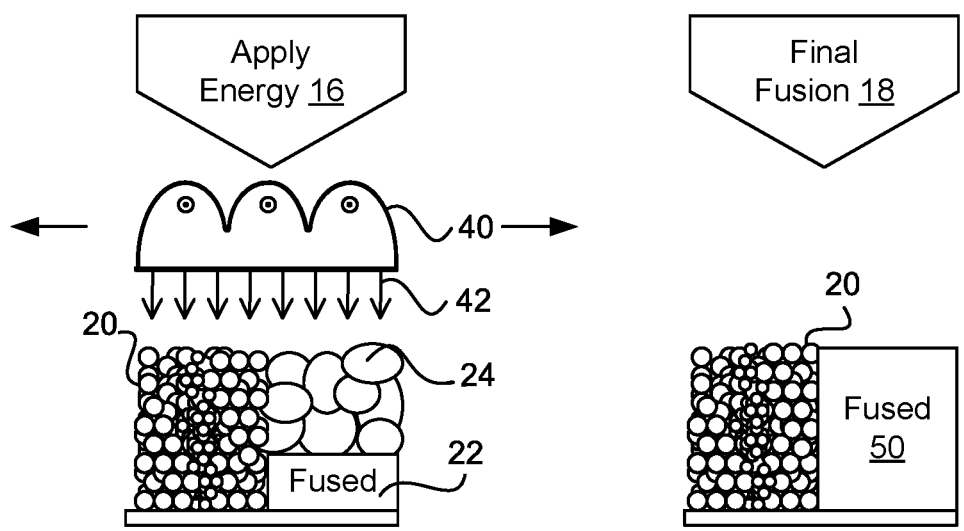

| Widthwise Location (mm) 256 | Lengthwise Location (mm) 354 | | | | | | | | | |
|---|---|---|---|---|---|---|---|---|---|---|
| | -100 | -75 | -50 | -25 | 0 | 25 | 50 | 75 | 100 | |
| -30 | 6.83 | 5.64 | 4.99 | 6.72 | 6.42 | 5.14 | 5.13 | 5.01 | 5.23 | |
| -20 | 13.71 | 14.10 | 13.76 | 14.23 | 14.36 | 14.06 | 14.17 | 14.14 | 12.69 | |
| -10 | 14.26 | 14.97 | 14.36 | 14.66 | 14.31 | 14.28 | 14.26 | 13.90 | 13.72 | |
| 0 | 13.38 | 13.91 | 13.58 | 13.62 | 13.72 | 13.54 | 13.43 | 13.58 | 12.88 | |
| 10 | 14.59 | 14.85 | 14.70 | 14.46 | 14.73 | 14.81 | 14.75 | 14.13 | 13.63 | |
| 20 | 11.22 | 11.68 | 11.19 | 11.69 | 10.92 | 10.64 | 10.52 | 11.09 | 10.53 | |
| 30 | 1.60 | 1.38 | 1.70 | 1.79 | 1.67 | 1.66 | 1.03 | 0.86 | 1.63 | |
| Mean 272 | 13.43 | 13.90 | 13.52 | 13.73 | 13.61 | 13.47 | 13.43 | 13.37 | 12.69 | |
| Std 274 | 1.32 | 1.32 | 1.38 | 1.21 | 1.55 | 1.64 | 1.69 | 1.29 | 1.29 | |
| Std % of Mean 276 | 9.85% | 9.53% | 10.19% | 8.79% | 11.36% | 12.21% | 12.60% | 9.68% | 10.16% | |
| Integration 278 | 75.59 | 76.53 | 74.28 | 77.17 | 76.13 | 74.13 | 73.29 | 72.71 | 70.31 | |

| | Integration along Width 280 | | |
|---|---|---|---|
| | Mean 282 | Std 284 | Std % of Mean 286 |
| | 74.46 | 2.04 | 2.74% |

Fig. 2D

400 — 402: Create single reflector having at least two elliptical-shaped reflector cavities each with a respective focus point, wherein the shape of the single reflector includes two partial elliptical shaped reflector surfaces having mirror-asymmetric profiles on each end of the single reflector each having a first side extending to a distal end and the first side longer than an opposite second side, and wherein remaining elliptical-shaped reflector cavities have a first side and a second side the same length as the opposite second sides of the two partial elliptical shaped reflector cavities.

412: Provide transparent window

414: Place each of a set of light tubes at the respective focus point in each reflector cavity 416: Stamp a piece of sheet metal to form the single reflector 418: Add a webbed structure to a surface opposite the reflector cavities to hold in shape the single reflector 420: Create an additional single reflector having at least one reflector cavity 422: Attach the additional single reflector to the webbed structure 424: Enclose the single reflector the webbed structure within a partial metal enclosure and the transparent window 426: Form metal fins within and attached to the partial metal enclosure

Fig. 4B

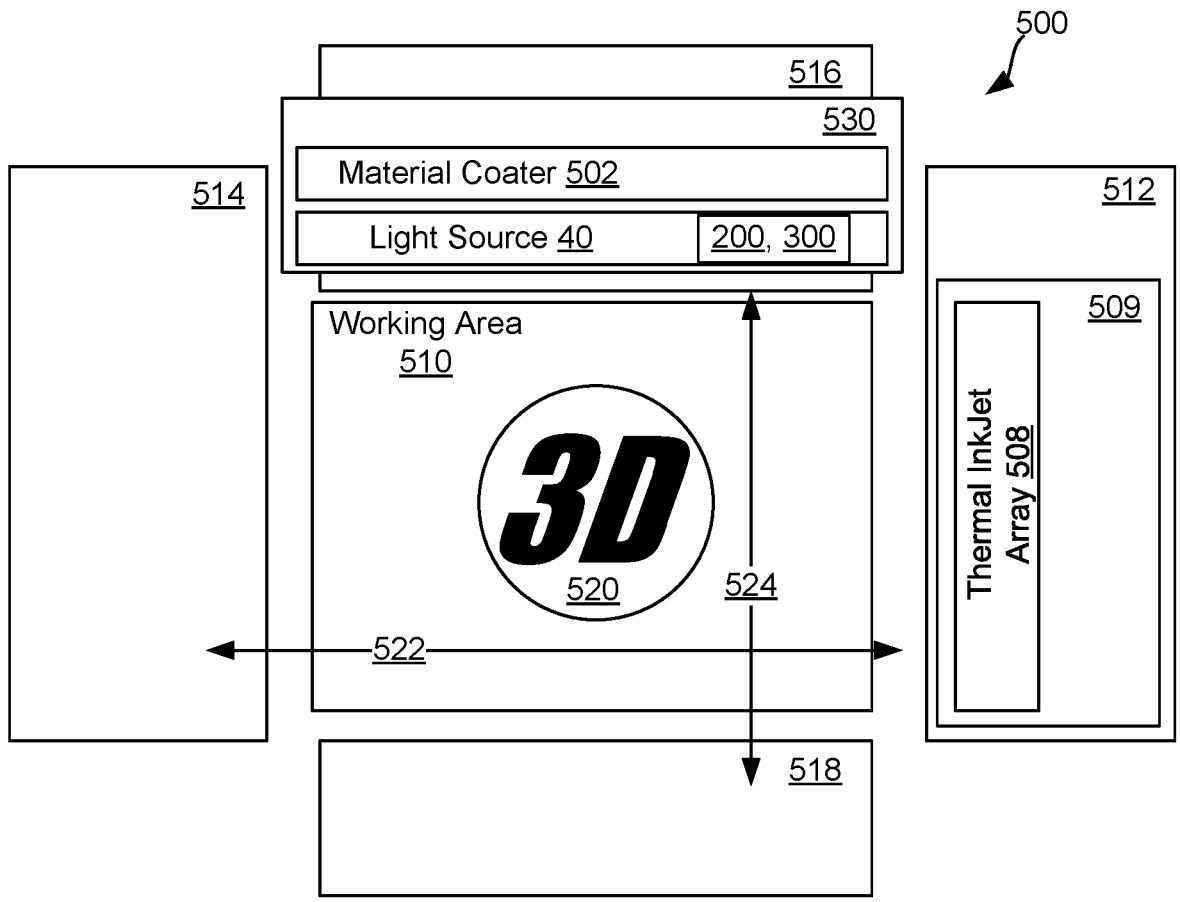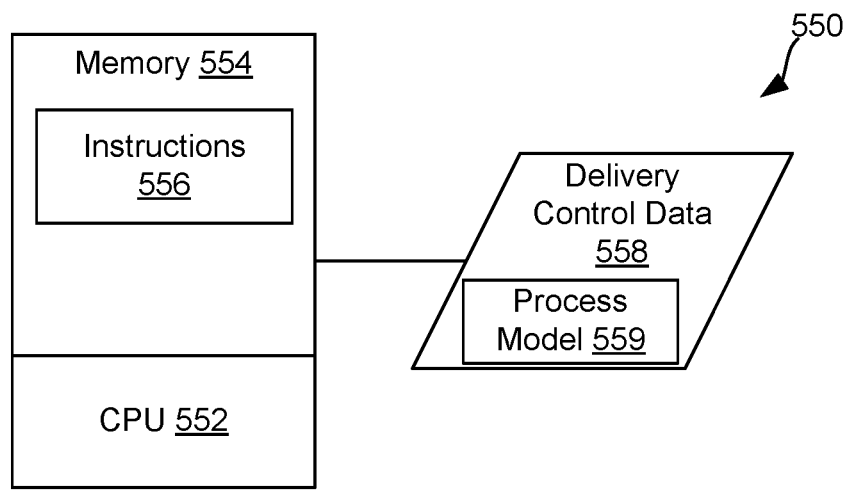
Fig. 5

REFLECTOR ASSEMBLY WITH PARTIAL ELLIPTICAL CAVITIES

BACKGROUND

Three-dimensional (3D) printing may be performed using an additive printing process used to make 3D solid objects from a digital process model. 3D printing is often used in rapid product prototyping, mold generation, and mold master generation. Additive printing processes involve the repeated application of successive layers of sintering material. Materials used in 3D printing may use one or more coalescing agents to fuse with the sintering material. The fusion may be accomplished using heat-assisted sintering with one or more light sources.

BRIEF DESCRIPTION OF THE DRAWINGS

The disclosure is better understood with reference to the following drawings. The elements of the drawings are not necessarily to scale relative to each other. Rather, emphasis has instead been placed upon clearly illustrating the claimed subject matter. Furthermore, like reference numerals designate corresponding similar, though perhaps not identical, components through the several views. For the sake of brevity, reference numerals or features having a previously described function may or may not be described in connection with other drawings in which they appear.

FIGS. 1A-1D are example operations in an example 3D powder and fusing agent based process;

FIG. 2D is a spreadsheet listing of sample values and statistics of the example reflector assembly in FIG. 2B;

FIG. 4A is a flow diagram of an example method of constructing a reflector assembly with partial elliptical cavities;

FIG. 4B is a set of example additional operations which may be performed with the method shown in FIG. 4A; and FIGS. 5 and 6 are example implementations of a system to perform the example 3D powder and fusing agent based process illustrated in FIGS. 1A-1D and/or the example methods of FIGS. 4A and 4B using a reflector assembly with partial elliptical cavities as shown in FIGS. 2A, 2B, and 3.

DETAILED DESCRIPTION

Figure 2A:
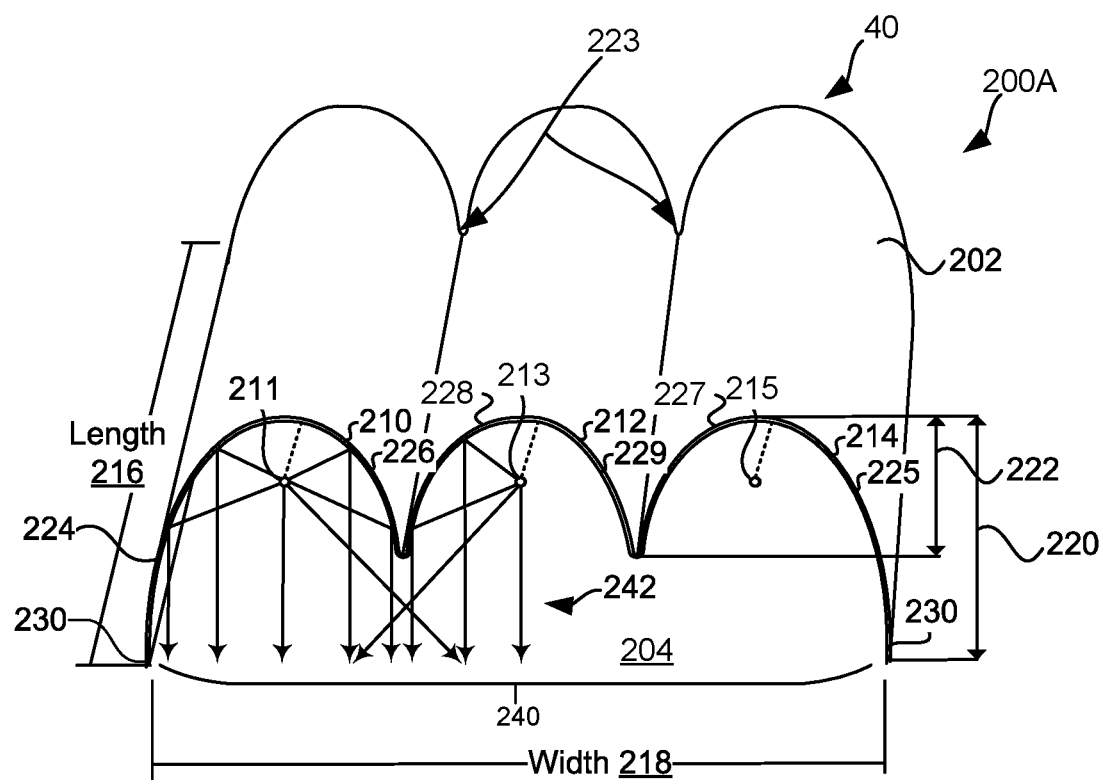
FIGS. 2A and 2B are perspective drawings of an example reflector assemblies having partial elliptical reflectors used to provide a substantially uniform energy distribution over an area.

To provide a low-cost solution to allow for simple air cooling and repairability, a reflector assembly with partial elliptical cavities may be used to create a light source for heat-assisted sintering processes. The light source provides uniform power distribution of energy across substantially both its length and width. Multiple light tubes and a specially shaped reflector may be used to prevent a Gaussian (non-uniform) heat distribution profile typical of light tube systems. Such non-uniform heating may result in undesirable non-uniform fusing for one or more part layers. Furthermore, when using more than one light tube, the heat from each light tube, if allowed to be directed directly to other light tubes, may cause them to overheat and thus fail or operate improperly.

Accordingly, to address these issues, a single reflector is disclosed that has multiple partial elliptical reflector cavities wherein the combined shaping of the elliptical reflectors is to provide substantially uniform illumination while preventing direct radiant emission between light sources. A partial elliptical reflector cavity has a two-dimensional (2D) mirror-asymmetric profile that extends along a length in a third dimension. The partial elliptical reflector cavity has a first locus of points extending in one direction from an axis of symmetry through a focus and vertex further than a second locus of points extending in an opposite direction from the axis of symmetry. For instance, for a parabolic partial elliptical reflector cavity described by a 2D quadratic function $Y=X^2$ having a vertex at $(X=0, Y=0)$, the partial elliptical reflector cavity extends in one of the plus or minus X directions from the vertex more than the other consequently leading to a longer Y or height of the partial elliptical reflector cavity for the respective longer plus or minus X direction from the vertex. This difference in X directions from the vertex creates the 2D mirror-asymmetric X-Y profile of the partial elliptical reflector cavity that is then extended along a length or channel in a third direction (see FIGS. 2A and 2B as examples). A traditional parabolic reflector has a mirror-symmetric profile.

Accordingly, in some implementations, the combined shaping includes a channel-like parabolic reflector for near parallel reflection of the reflected light although other elliptical-shapes which provide slightly non-parallel reflection may also be used along with the mirror-asymmetric X-Y profile along a length or channel. For this disclosure, elliptical-shape includes parabolic-shapes as one sub-set. More context and detail on the specifics of example implementations, how to make and use the disclosed reflector assembly follow in the description of the accompanying figures.

First, in FIGS. 1A-1D a brief introduction is presented to provide an example 3D printing context for the use of the reflector assembly with mirror-asymmetric profile partial elliptical cavities. For instance, FIGS. 1A-1D are example operations in an example method of a three-dimensional (3D) powder and fusing agent based process 100. The method may utilize a scanned beam of light across a working area as in FIG. 1C with a light source 40 having a reflector assembly with mirror-asymmetric profile partial elliptical cavities to provide substantially uniform irradiation 42 along with substantial light source thermal radiation isolation. During part forming of the 3D powder and fusing agent based process 100, over time, a partial or an entire layer of a sinterable material 20 is exposed to radiation from light source 40, but just a selected region 24 of the sinterable material 20 is fused and hardened to become a layer of a 3D object 50.

For example, in FIG. 1A a material coating operation 12 places and levels sinterable material 20 in layers to a working area (510, FIG. 5) which may have one or more layers of previously fused sinterable material 22. After the sinterable material 20 is placed in the working area, in FIG. 1B, one or more coalescent dispersion(s) 30 containing various agents are deposited in an apply agents 14 operation onto the sinterable material 20 where fusion of the material is to occur. The coalescent dispersion 30 containing a selectively applied agent is in contact with the selected region 24 of the sinterable material 20. The coalescent dispersion(s) 30 may include a water-soluble or a water-dispersible infrared or near-infrared fusing agent (other light frequencies such as U/V, far infra-red, and visible light are possible), which is capable of penetrating into the layer of the sinterable material 20 and surround the exterior surface of the sinterable material 20 as illustrated in selected region 24. In some examples, the coalescent dispersion 30 contains the aqueous vehicle and the fusing agent alone. In other examples, alternative coalescent dispersions 30 may include a surfactant, a biocide, a gloss enhancing agent, a pigment, chemical binders, curing agents, and/or combinations thereof. More examples of sinterable material 20, coalescent material 20, and fusing agents are described with respect to the 3D printing system illustrated in FIG. 5 below.

In FIG. 1C, the deposited fusing agent can absorb the radiation from the light source 40 by an applied energy operation 16 of applying substantially uniform energy 42 to the agent-coated sinterable material 20 in selected region 24, thus converting the absorbed radiation into thermal energy.

In FIG. 1D, in a final fusion 18 operation this thermal energy in turn melts or sinters the sinterable material 20 that is in contact with the fusing agent. This causes the sinterable material 20 to fuse to form a fused layer 50 of the 3D object while the non-agent applied sinterable material 20 remains unfused. More detail on how an example 3D fusion process may be modified and built is described in the system of FIG. 5 below.

Figure 2B:
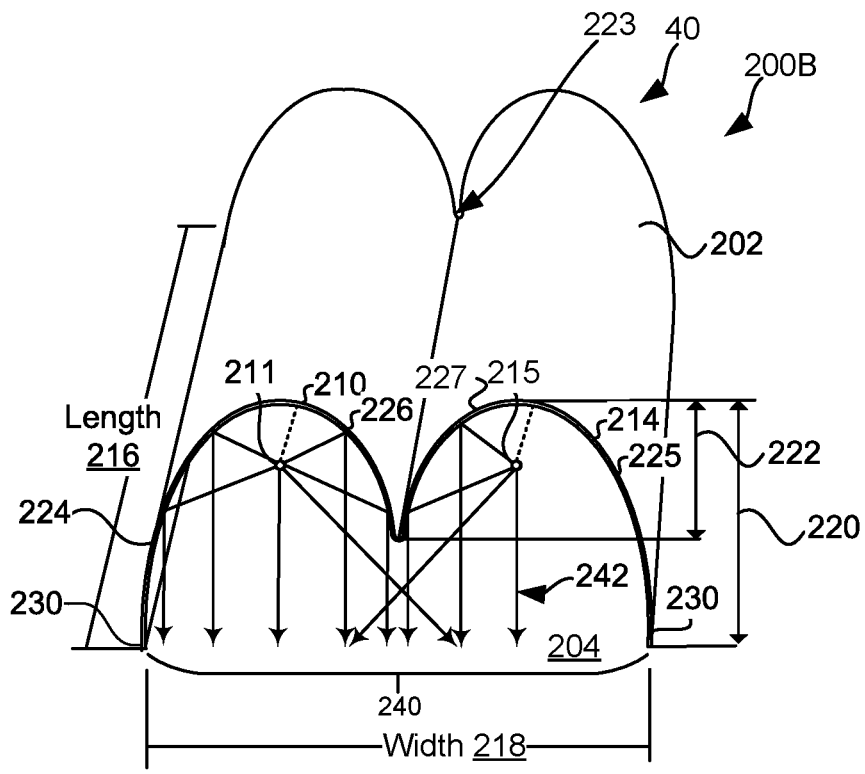

FIGS. 2A and 2B are example a perspective drawings of example reflector assemblies 200A, 200B (hereinafter collectively reflector assemblies 200 unless context suggests otherwise) for light source 40 of FIG. 1C that has mirror-asymmetric profile partial elliptical cavity reflectors 210, 214 used to provide a substantially uniform energy distribution 240 over an area encompassing the length 216 and width 218 of the reflector assembly 200. FIG. 2A includes an additional center or mesial elliptical cavity reflector 212 to demonstrate that one or more additional center or mesial elliptical cavity reflectors may be added to increase the width and provide more energy for fusing while maintaining uniform energy distribution 240. As used herein, the term 'width' generally denotes the shortest dimension in the opening and the term 'length' denotes the longest dimension. However, in some examples, the term 'width' may be interchangeable with 'length'. Like reference numbers in FIGS. 2A and 2B correspond to the same functional parts as described below for both reflectors 200A, 200B (collectively 200) in the interest of brevity.

The reflector assembly 200A may include a single reflector 202 having at least three elliptical-shaped reflector cavities 210, 212, 214 each with a respective focus point 211, 213, 215 along the length of the single reflector 202. The reflector assembly 200B may include a single reflector 202 having two elliptical-shaped reflector cavities 210, 214 each with a respective focus point 211, 215 along the length of the single reflector 202. Reflector assemblies 200 have a distal opening 204 encompasses a length 214 and a width 216 of an opening at distal ends 230 of the single reflector 202. The shape of the single reflector 202 includes two partial elliptical-shaped reflector cavities 210, 214 with mirror-asymmetric profiles on each end of the single reflector 202 and each having a first side 224, 225 extending a length along a first height 220 to a distal end 230 and the distal opening 204 and the first side 224, 225 longer than an opposite second side 226, 227. Any remaining elliptical-shaped reflector cavities(s) 212 (with mirror-symmetric profiles such as shown in FIG. 2A) have a first side 228 and a second side 229 extending the same length along a second height 222 as the opposite second sides 226, 227 of the two partial elliptical-shaped reflector cavities 210, 214.

The single reflector 202 may also include a set of light tubes 306 (see FIG. 3), each situated at the respective focus point 211, 213, 214 of each respective reflector cavity 210, 212, 214 along the length of the single reflector 202. The extension of the opposite second sides 226, 227 is sufficient to block and prevent direct radiation between the adjacent light tubes 306. In addition, the shape of the single reflector 202 may provide air gaps 223 between the adjacent reflectors cavities to minimize thermal conduction in the single reflector 202 itself. For reflector assembly 200A in FIG. 2A, while one remaining mirror-symmetric profile elliptical-shaped reflector cavity 212 is shown in this example, there may be one or more additional remaining mirror-symmetric profile elliptical-shaped reflector cavities 212 disposed between the two mirror-asymmetric profile partial elliptical-shaped reflector cavities 210, 214 at each end of the reflector assembly 200 as well as more air gaps 223.

A partial light ray diagram 242 in each of FIGS. 2A and 2B illustrates a substantially uniform energy distribution 240 with the single reflector 202. Single reflector 202 includes multiple elliptical reflectors generally having a parabolic shape to provide a substantially parallel light along with non-parallel light from the any light source at focus points 211, 213, 215 along the length of the single reflector 202, such as a set of light tubes 306 (FIG. 3), to cover shadows caused by the unique non-uniform shaping of the elliptical reflector cavities 210, 212, 124. The combination of the end or distal mirror-asymmetric profile partial elliptical cavity reflectors along with any central or mesial mirror-symmetric profile elliptical reflector cavities provides the desired uniform illumination while preventing direct radiant emission and thermal conduction between light sources disposed along the length of the single reflector 202 at focus points 211, 213, 215.

Figure 2C:
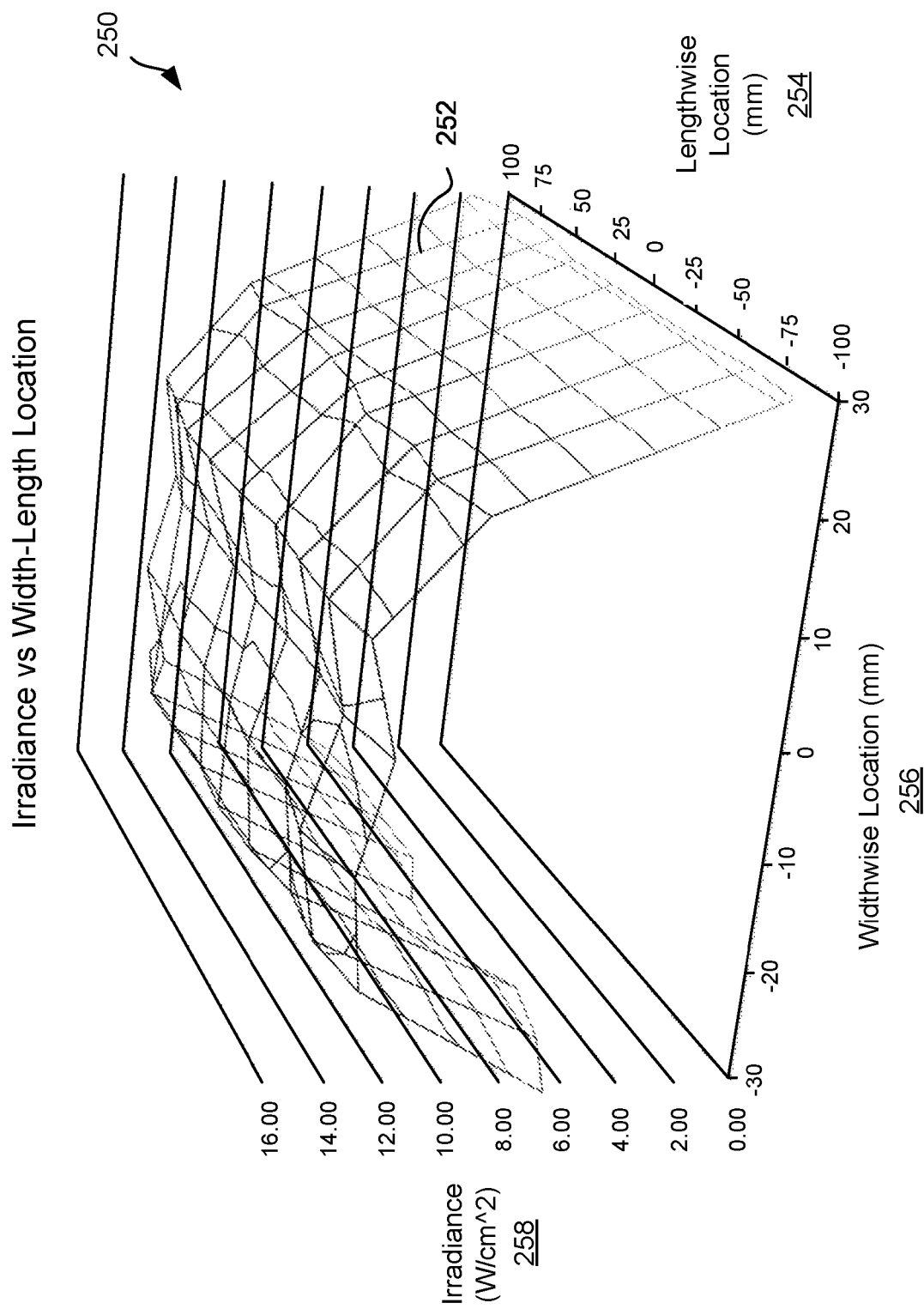
FIG. 2C is a perspective wire diagram illustrating the irradiance output from the example reflector assembly in FIG. 2B.

FIG. 2C is an example plot 250 with a perspective wire diagram 252 illustrating example empirical test results of irradiance output 258 of substantially uniform distribution 240 from the example reflector assembly 200B shown in FIG. 2B. The sample values shown for the irradiance 258 are in reported in Watts/cm$^2$ as measured through a 4.65 mm aperture at the shown lengthwise locations 254 and widthwise locations 256 each denominated in millimeters (mm) from the center (0 mm, 0 mm) of the single reflector 202. The empirical sample values are also found in the spreadsheet table 260 of FIG. 2D. As illustrated, along a particular lengthwise location 254 spot line, the irradiance 258 is substantially uniform. Along a particular widthwise location 256 spot line, the irradiance 258 is substantially uniform between −20 mm and 20 mm and drops off a bit between −30 mm and −20 mm and 20 mm and 30 mm. In some examples, a mask on the transparent window 204 along the periphery and extending 10 mm from the distal outside edge of the transparent window 204 would allow for a tighter uniform distribution. However, in other example implementations, it may be desirable to have the leading and trailing irradiance less than the center irradiance along the width to allow for a transition warm-up and cool down as will be explained further in FIG. 2E.

FIG. 2D is an example spreadsheet table 260 of empirical sample values 258 and statistics 270 of the example reflector assembly 200B of the single reflector 202 shown in FIG. 2B and used to create the example plot 250 of FIG. 2C. The empirical values of irradiance 258 are shown via lengthwise location 254 and widthwise location 256. Statistics 270 of the lengthwise locations of example spreadsheet table 260 include the mean (average) 272, the standard deviation (population) (Std) 274 along with the Std percent (%) of the mean 276. As shown, the Std % of the mean values are all less than 13% of the mean. Thus, substantially uniform may be defined as having a Std % of mean along the length of the reflector assembly 200 that is less than 13% of the mean or more generally is less than 15% for all widthwise locations 256. In some example implementations of use of the example reflector assembly 200, substantial uniform may mean having a Std % of mean along a length of the reflector assembly 200 that is less than 20% or 25% of the mean for all widthwise locations 256 depending upon various system and/or material requirements.

In one example implementation of a system (see for example FIG. 5 or FIG. 6) using the example reflector assembly 200, the assembly 200 may be moved across a bed of sintering material 20 to reduce the variability of the irradiance in a particular spot line along the width as the sintering material 20 is uniformly fused. Statistics 270 also include an integration row 278 of integration of total irradiance along the widthwise locations 256. Integration statistics 280 show an integration mean 282, an integration standard deviation (population) 284, and an integration Std % of the mean 286. Accordingly, along any particular spot line location along the widthwise location 256, the Std % of the mean 286 is less than 3%. Accordingly, incorporating using movement of the light source 40 with the example reflector assembly 200, substantially uniform may be defined as having a Std % of the mean along the length of the reflector assembly 200 of less than 3% or more generally less than 5% for all widthwise spot lines.

Figure 2E:
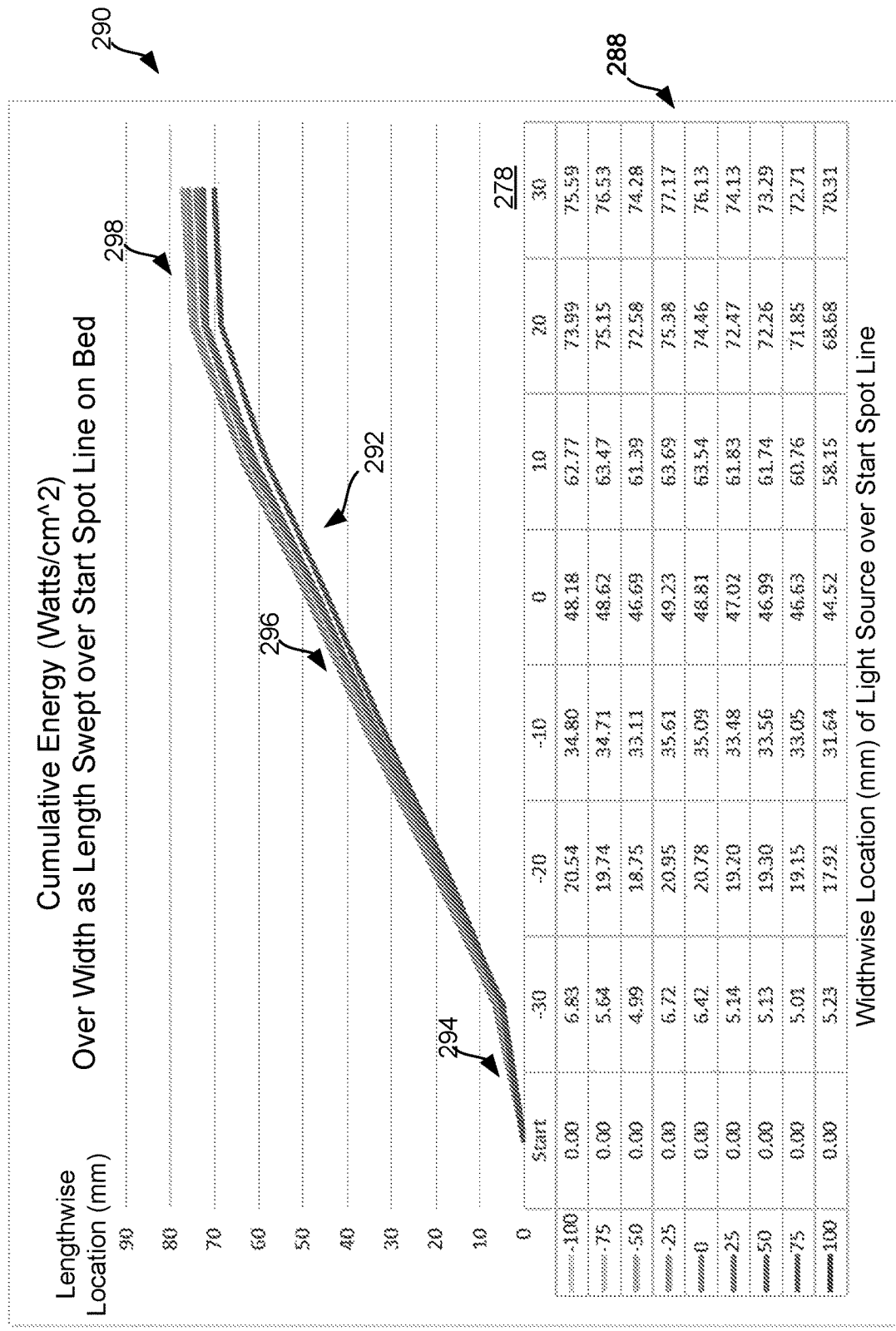
FIG. 2E is a chart of cumulative energy over a spot line on a 3D printer bed when swept by the example reflector assembly of FIG. 2B.

FIG. 2E is a chart 290 of cumulative energy 292 over a spot line on 3D printer bed work area 510 (see FIG. 5 or FIG. 6) when swept by the example reflector assembly 200B of FIG. 2B and reflecting the empirical data used in FIG. 2D. For instance, integration table 288 illustrates the cumulative energy received by a particular location along the spot line on an example 3D printer bed with respect to the example reflector assembly 200B of FIG. 2B. The columns indicate the start and relative widthwise locations of the example reflector assembly as it traverses over the particular spot line location. The rows indicate the relative lengthwise location of the example reflector assembly 200B. The column indicating "30" 278 is the total cumulative energy received at each lengthwise location of the particular spot line on the 3D printer bed. These are the same computed values as shown in FIG. 2D in the integration row 278. The chart 290 shows for each lengthwise location a beginning first region 294 with a slowly increasing slope, a center second region 296 with a constantly increasing substantially uniform collection of energy, and a final third region 298 with a slower increasing collection of energy. This profile of the lengthwise locations illustrates the uniformity between the various lengthwise locations as well as the uniform and steady energy accumulation as the example reflector assembly traverses over a 3D printer bed. The beginning first region 294 may provide a preheat function by not heating the sinterable material 20 quickly which may cause boiling of the aqueous or non-aqueous carrier containing the agent. Further, once the spot line has been preheated, a continuous constant (substantially uniform) irradiation of energy in the center second region 296 on the spot line ensures that the sinterable material 20 is heated evenly to allow for uniform fusion of each layer. The final third region 298 allows the sintering material to slowly transition to no further energy to allow for proper annealing the sinterable material 20, rather than having a step-function transition to no further energy in which a rapid hardening may occur and cause some fused sinterable material 20 to be brittle. Accordingly, the light source 40 including reflector assembly 200 may traverse across a working area 510 (FIG. 5 of FIG. 6) and the reflector assembly 200 provides a pre-heat energy profile, a substantially uniform energy profile, and an anneal profile to any coalescent dispersions 30 on at least a portion of the sinterable material 20.

In some example implementations, it may be more desirable to have just the center section region 296 illuminate the sinterable material 20 and use either additional lamps to perform the pre-heat and/or annealing functions. In other implementations, the motion of the example reflective assembly 200 may be controlled by a processor (see CPU 552 in FIG. 5 and FIG. 6) and the speed adjusted to provide or remove the pre-heat and annealing functions of the example reflective assembly 200. Accordingly, the example reflective assembly 200 can be constructed and used in multiple ways with various methods to provide a substantially uniform power distribution across both its length and width as it traverses across a 3D printer bed work area 510.

Figure 3:
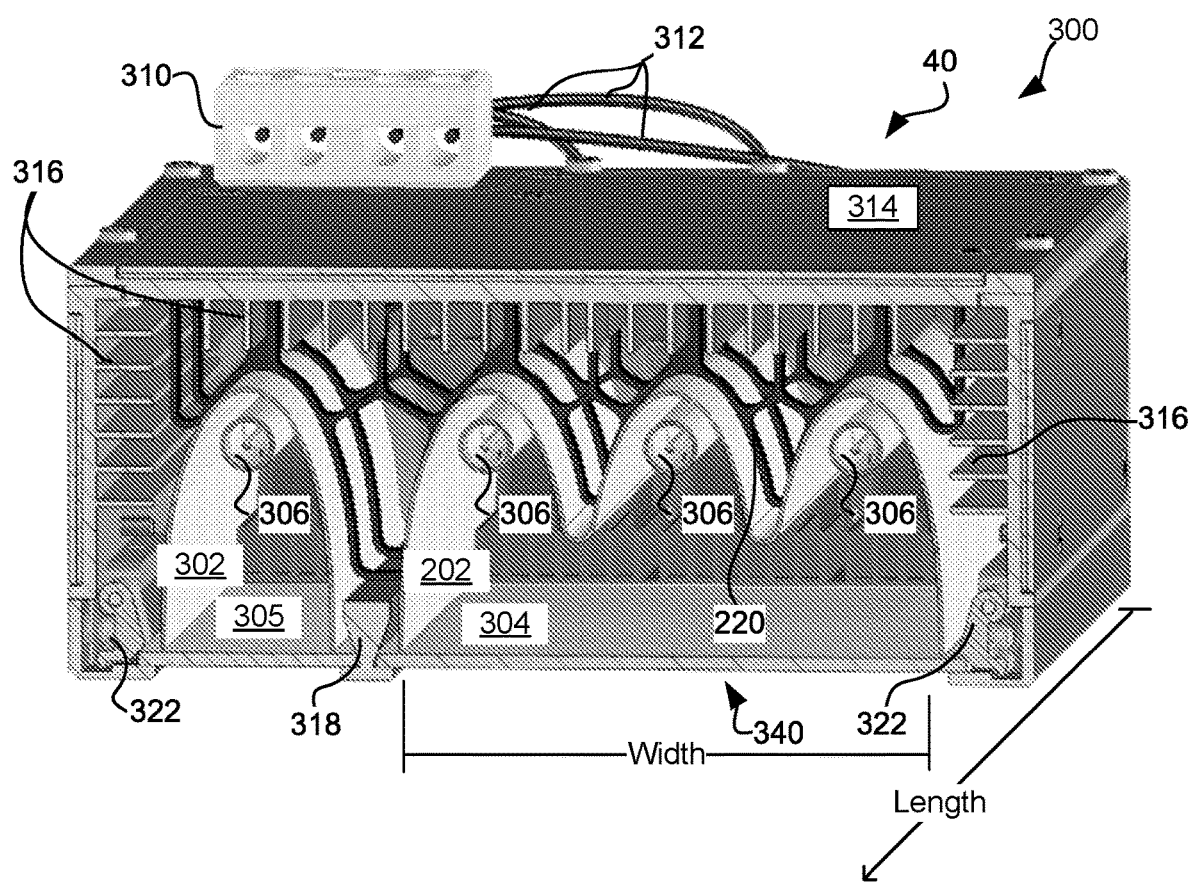
FIG. 3 is a cross-section of a perspective view of an example reflector assembly illustrating additional components.

As just one illustrative example, FIG. 3 is a cross-section perspective view cut-away along the width within a length of an example reflector assembly 300 showing additional components that may be used to create an example light source 40 (FIG. 1C) with substantially uniform power distribution 340. Additional components may include a partial metal enclosure 314, a set of light tubes 306, a ballast 310, a transparent window 304, and a webbed structure 220 disposed between the single reflector 202 and the partial metal enclosure 314. The ballast 310 may be connected to the light tubes with a set of ballast cables 312 for delivering energy to the set of light tubes 306.

Additional aspects of the example reflector assembly 300 to address the issues of using the set of tube light tubes 306 may include making the single reflector 202 from a single piece of thin metal. Because the thin metal may expand and lose shape as it is heated and cooled, the overall shape of the single reflector 202 may be held in place by the webbed structure 220 that further allows heat from the single reflector 202 to escape into the ambient air or be thermally conducted to the partial metal enclosure 314. The webbed structure 220 may also be used to contain one or more separate additional reflectors 302, such as for having a different frequency of light for additional sinterable materials and/or a pre-heater to help speed fusion. Additionally, the single reflector 202 and webbed structure 220 may be enclosed by the partial metal enclosure 314 and the transparent window 304 to allow the heat generated by the reflection assembly 300 to be captured and removed via an air system, although other cooling solutions are possible. In some examples, the example reflector assembly 300 may not have any transparent windows 304 as one additional method of cooling. One way of capturing the heat dissipated by the single reflector 202 is to use metal fins 316 attached to the partial metal enclosure 314 to increase the interior surface area of the partial metal enclosure 314.

Accordingly, in this example, the single reflector 202 is made of a stamped piece of thin sheet metal and coated with one or more reflective coatings on the inner surfaces to form the reflector. Because the thin sheet metal may expand and lose shape when thermal heat from the set of light tubes 306 are absorbed, the shape of the thin metal reflector is held in place by the webbed structure 220. In one example, the webbed-structure is made of a lightweight material, such as aluminum, and in another example made of a non-thermally conducting material, such as a high temperature plastic, to prevent non-uniform distribution of heat along the outside surface of the single reflector 202. The heat radiating from the outside surface of the single reflector 202 may be transferred by the ambient air inside the reflector assembly and captured by a set of metal fins 316 thermally coupled to the partial metal enclosure 314. This structure allows for an air cooling solution (not shown) such as a fan-based, a blower, heat pipe transfer, a ducted assembly, or other thermal transport system to keep the example reflector assembly 300 cool during normal operation.

Along with single reflector 202, the example reflector assembly 300 may include one or more additional reflectors 302 to include additional light sources, such as a preheater and/or one that has a different frequency for curing additional agents in dispersions 30. The additional reflector 302 may include an additional transparent window 305. While the additional reflector 302 shown has a single mirror-symmetric elliptical reflector, the additional reflector 302 may also encompass an additional single reflector 202 with reflective mirror-asymmetric profile partial elliptical cavities.

The transparent windows 304 and 305 may be of the same material or may be different depending on the application. In some examples, the transparent windows 304, 305 are made of quartz glass also known as fused quartz or fused silica. Fused quartz or fused silica is glass involving silica in amorphous (non-crystalline) form. It differs from traditional glasses in containing no other ingredients, which are typically added to glass to lower the melt temperature. Fused silica, therefore, has high working and melting temperatures. The optical and thermal properties of fused quartz are superior to those of other types of glass due to its purity. As a clear vitreous solid, formed by melting pure silica, quartz glass can withstand high temperatures during operation of example reflector assembly 300 and depending on any added impurities, may be extremely transparent to infra-red, near-infrared, visible, and ultraviolet radiations. Quartz glass's low coefficient of thermal expansion also makes it a useful material for maintaining an air-tight seal of the reflector assembly 300. The transparent windows 304, 305 may include additional masking, such as along the edges, to limit the outgoing irradiation to provide an even more uniform power distribution 340. Also, the transparent windows 304, 305 may also include additional filter coatings to narrow or target otherwise the specific irradiation frequency output. The transparent windows 304, 305 may be held in place to the partial metal enclosure 314 using one or more latches 322 and a non-thermal conductor interposer 318 between multiple transparent windows 304, 305 to prevent thermal transfer between the single reflector 202 and the additional reflector 302.

FIG. 4A is a flow diagram of an example method 400 of constructing a reflector assembly 200, 300 with partial elliptical reflective cavities having mirror-asymmetric profiles. In block 402, a single reflector 202 is created having two, three or more elliptical-shaped reflector cavities 210, 212, 214, each with a respective focus point 211, 213, 215 along their length. The shape of the single reflector 202 includes two partial elliptical-shaped reflector surfaces 210, 214 on each end of the single reflector 202. Each of the partial elliptical-shaped reflector surfaces 210, 214 have a first side 224, 225 extending to a distal end 230 (and the distal opening 204) and the first side 224, 225 is longer than an opposite second side 226, 227. Any remaining elliptical-shaped reflector cavities 212 have a first side 228 and a second side 229 the same length as the opposite second sides 226, 227 of the two partial elliptical-shaped reflector cavities 210, 214.

FIG. 4B is a set of example additional operations 410 which may be performed with the method shown in FIG. 4A for some implementations. In block 412 a transparent window 304 may be provided. Depending on the particular light source 40, sintering material 20, and coalescent dispersions 30 used, the window material is transparent to at least those frequencies needed to fuse the sinterable material 20. There may be one or more coatings of dielectric material on the transparent window to provide anti-reflective, polarization, or wavelength filtering functions. In some instances, there may be more than one transparent window for separate light sources (see FIG. 3) or there may be more than one transparent window in the path of the light source 40 such as an extra layer of glass (not shown) to allow for cleaning or for removal if contaminated by dust, debris, sinterable material, agent vapors, and the like without having to remove and break the seal of the fused quartz or another dielectric coated window.

In block 414 a set of light tubes 306 are each placed at the respective focus point in each elliptical-shaped reflector cavity. 210, 212, 214. The opposite second sides extend sufficiently to block and prevent direct radiation between the set of light tubes 306. For instance, the set of light tubes 306 may be a high-powered line-source halogen bulb with a radiation temperature of more than 2500K with a high flux density. The halogen bulb may contain tungsten or other filaments aligned along the focus point axis of the elliptical-shaped reflectors and the filaments having a low mass to enable a rapid-reaction control of the radiation flux density in the near infra-red.

In addition, block 402 may include the block 416 where the single reflector 202 is created by stamping a piece of sheet metal to form the single reflector 202. This stamping process results in a low piece cost for the single reflector 202 as just one mold for the stamping need be created from a block of aluminum, steel or other metal. Further, the thin sheet metal and air gaps 223 minimize thermal conduction between reflector cavities. In some implementations, the single reflector may be made of a formed or molded quartz glass substrate or from a cast, molded, or machined block of metal. Generally, each elliptical surface of single reflector 202 may be coated with a reflective metal such as by sputtering or other deposition. In some implementations, one or more layers of dielectric materials of various metals and metal oxides may be deposited to form the reflective surface as well as filtering of various wavelengths. For instance, a reflector coating in one implementation may include a set of coatings that allow one or more wavelengths of light to be reflected while filtering and absorbing (into heat) the remaining wavelengths of light. However, for one of the simplest implementations, the light tubes 306 may be designed to emit a range of wavelengths and the reflective coating on the single reflector 202 may be a simple metal coating such as silver.

Example method 400 may include the block 418 in which a webbed structure 220 may be added to the surface opposite the reflector cavities to hold in shape the single reflector 202 (see FIG. 3). The webbed structure 220 may be thermally insolating in some examples but may be thermally conducting in other implementations. For instance, when air removal of the heat is desired, the webbed structure 220 may be partially or fully thermally isolating to allow the single reflector 202 to maintain a uniform thermal profile across it outer surface. However, depending on the webbed structure 220 design and how it covers the opposite side of the reflector, if thermally conductive the single reflector 202 may still maintain a uniform thermal profile.

In some implementations, it may be useful to have more than one light source 40 to allow for pre-heating or the use of different agents with the sinterable material 20 that are sensitive to non-infrared light. For instance, in one implementation, a first light source 40 may be used to fuse the sinterable material 20 before a different second light source 40 is used to release pigment, change pigment color, provide local annealing of material, etc. Accordingly, example method 400 may also include the block 420 of creating an additional single reflector 302 having at least one reflector cavity (see FIG. 3). This additional single reflector may be thermally isolated or it may share the thermal dissipation structure of the single reflector 202. In block 422, the additional single reflector 302 may be attached to the webbed structure 220.

Block 424 may be added to example method 400 along with block 418 to allow enclosing the single reflector 202 and the webbed structure 220 within a partial metal enclosure 314 and the transparent window 304. Enclosing the single reflector 202 within the partial metal enclosure 314 allows any heat radiating off the single reflector 202 to be captured within the partial metal enclosure 314 and evacuated using either an air or other coolant solution, such as heat pipes. When using air within the partial metal enclosure for heat removal, in block 426, metal fins may be formed and attached to and within the partial metal enclosure 314 to allow for a larger surface area to pick up the internal heat and thermally allow conduction to another metal area where the heat may be removed by additional cooling solutions.

FIG. 5 is an implementation of one example 3D printing system 500 to perform the example 3D powder and fusing agent based process 100 illustrated in FIGS. 1A-1D and/or the example methods of FIGS. 4A and 4B using a reflector assembly 200, 300 with partial elliptical-shaped cavities 210, 214 having mirror-asymmetric profiles with one or more light sources 40. System 500 includes a processor in the form of one or more central processing units (CPU) 552 to control via instructions 556 stored on one or more tangible and non-transitory computer readable memories 554. Such memory may be internal or external to the system and includes, processor cache at multiple levels (L1, L2, L3, L4), dynamic random access memory (DRAM), static random access memory (SRAM), read-only memory (ROM), non-volatile random access memory (NV-RAM), hard disk magnetic memory, hard disk semiconductor memory, optical memory, cloud memory storage, network storage, and like storage mechanisms as well as others known to those of skill in the art. The instructions, when read and executed by the processor allow the processor, CPU 552, to read delivery control data 558 which includes process model 559 information in the form of databases, lists, tables, and other data structures such as XML, 3D Manufacturing Format (3MF), VRML, X3D, and Additive Manufacturing File Format just to name a few, to define how system 500 is to render a 3D object 520. The CPU 552 manipulates and transforms data represented as physical (electronic) quantities within the 3D system's 500 component registers and memories in order to control the various physical elements such as the thermal inkjet array 508, light sources 40, and material coater 502 to create a 3D object 520. The delivery control data 558 for the selective delivery of the sinterable material 20, the coalescent dispersion 30, etc. may be derived from a process model 559 of the 3D object 520 to be formed. The light source 40 includes one or more reflective assemblies 200, 300 with mirror-asymmetric profile partial elliptical cavities.

System 500 also may include one or more working areas 510 for building the 3D object 520 and a first staging area 512 and a second staging area 514 for hosting and storing a thermal inkjet array 508 supported on a first carrier 509. First carrier 509 traverses back and forth in a first direction 522 across the working area 510 to allow for dispersing of the coalescent dispersions 30 on the sintering material 20. The one or more light sources 40 and a material coater 502, in this implementation, traverse back and forth across a second direction 524 orthogonal from the first direction 522 from a third staging area 516 to a fourth staging area 518. In some examples, the light source 40 may be stationary over the working area 510. In other examples, the material coater 502 and the light source 40 may be attached to a second carriage 530. The material coater 502 places the sinterable material 20 onto the working area 510. In one example, the material coater 502 works by applying a layer of sinterable material 20 as the material coater 502 traverses from third staging area 516 to fourth staging area 518. On the return, the material coater 502 extends a bar, roller, or other object to level the deposited sinterable material 20 to a uniform top surface.

Once the sinterable material 20 is deposited, the carrier 509 with the thermal inkjet array 508 traverses from the first staging area 509 to the second staging area 514 to deposit in select locations on working area 510 based on delivery control data 558 where sinterable material 20 is to be fused to create 3D object 520. Once the thermal inkjet array 508 is parked in the third staging area 514, the one or more light sources 40 traverses along the second direction 524 to apply energy substantially uniformly across the sinterable material 20 in the working area 510. In some implementations, there may be second light source 40 that precedes a first light source 40 that is used to pre-heat the sinterable material to speed fusion. In other examples, the power distribution of the light source 40 may provide the pre-heating profile and an annealing profile as described in FIG. 2E. In other examples, the processor 552 may programmatically control the amount of energy irradiated by light source 40. Accordingly, the processor 552 may cause the light source 40 to traverse across the working area 510 and the light source 40 provides a pre-heat energy profile, a substantially uniform energy profile, and an anneal profile to the coalescent dispersions 30 on at least a portion of the sinterable material 20.

While a single thermal inkjet array 508 is shown in FIG. 5, in some examples multiple thermal inkjet arrays may be used that span the width of the working area 510. In some implementations, the thermal inkjet array 508 may be attached to a moving XY stage or a translational carriage (neither of which is shown) that moves the array 508 adjacent to the working area 510 to deposit the coalescent dispersion 30 in desirable area(s). The thermal inkjet array 508 may be programmed to receive commands from the central processing unit 552 and to deposit the coalescent dispersion 30 according to a pattern for the first layer 22 of the 3D object 520.

For example, a material coater 502 places the sinterable material 20 in layers to the working area 510 which may have one or more layers of previously fused sinterable material 20. Working area 510 is generally configured to move down to allow additional layers of sinterable material 20 to be applied or placed by the material coater 502. After the sinterable material is placed, one or more agents of coalescent dispersion(s) 30 are deposited on the sinterable material 20 where fusion of the material is to occur. A coalescent dispersion 30 is selectively applied in contact with the selected region of the sinterable material 20. The coalescent dispersion(s) 30 disclosed herein may include a water-soluble or a water-dispersible infrared or near-infrared fusing agent, which is capable of penetrating into the layer of the sinterable material and envelop the exterior surface of the sinterable material 24. This fusing agent is capable of absorbing radiation from a light source 40 by it applying energy to the sinterable material 20 thus converting the absorbed radiation to thermal energy. This thermal energy in turn melts or sinters the sinterable material 20 that is in contact with the fusing agent. This causes the enveloped sinterable material in selected regions 24 to fuse to form the fused layer 50 of the 3D object 520 while the non-agent sinterable material 20 remains unfused. In some examples, the coalescent dispersion 30 may contain the aqueous vehicle and the fusing agent alone. In other examples, alternative coalescent dispersions 32 includes a surfactant, a biocide, a gloss enhancing agent, a pigment, and/or combinations thereof.

After a layer of the sinterable material 20 is deposited in the working area 510, the layer is exposed to heating (as shown in FIG. 1C). Heating may be performed by one or more light sources 40 to pre-heat the sinterable material 20, and thus it is desirable that the pre-heat heating temperature be below the melting point of the sinterable material 20. As such, the temperature selected will depend upon the sinterable material 20 that is used. As examples, the heating temperature may be from about 5° C. to about 50° C. below the melting point of the sinterable material. In an example, the heating temperature ranges from about 50° C. to about 350° C. In another example, the heating temperature ranges from about 60° C. to about 170° C. In some implementations, the pre-heating may occur after the coalescent dispersion(s) 30 are selectively applied. In other implementations, after pre-heating the coalescent dispersion(s) 30 is/are selectively applied in the desired area(s), the entire layer of the sinterable material 20 and the coalescent dispersion(s) 30 applied to at least a portion of the sinterable material 20 are exposed to further infrared or near-infrared radiation.

The infrared or near-infrared radiation is emitted from a light source 40 having a single reflector having multiple partial elliptical cavities with mirror-asymmetric profiles, such as an IR or near-IR curing line-type halogen lamp. In alternative implementations, the light source 40 may be alternatively attached, for example, to the first carriage 509 that also holds the thermal inkjet array 508. The first carriage 509 may move the light source 40 into the first staging area 512 that is adjacent to the working area 510. The light source 40 may be programmed to receive commands from the central processing unit 552 and to expose the layer of sinterable material 20 and any coalescent dispersions 30 to IR or near-IR energy. The length of time the radiation is applied for, or energy exposure time, may be dependent, for example, on one or more of: characteristics of the light source 40; characteristics of the sinterable material 20; and/or characteristics of the coalescent dispersion(s) 30.

Figure 6:
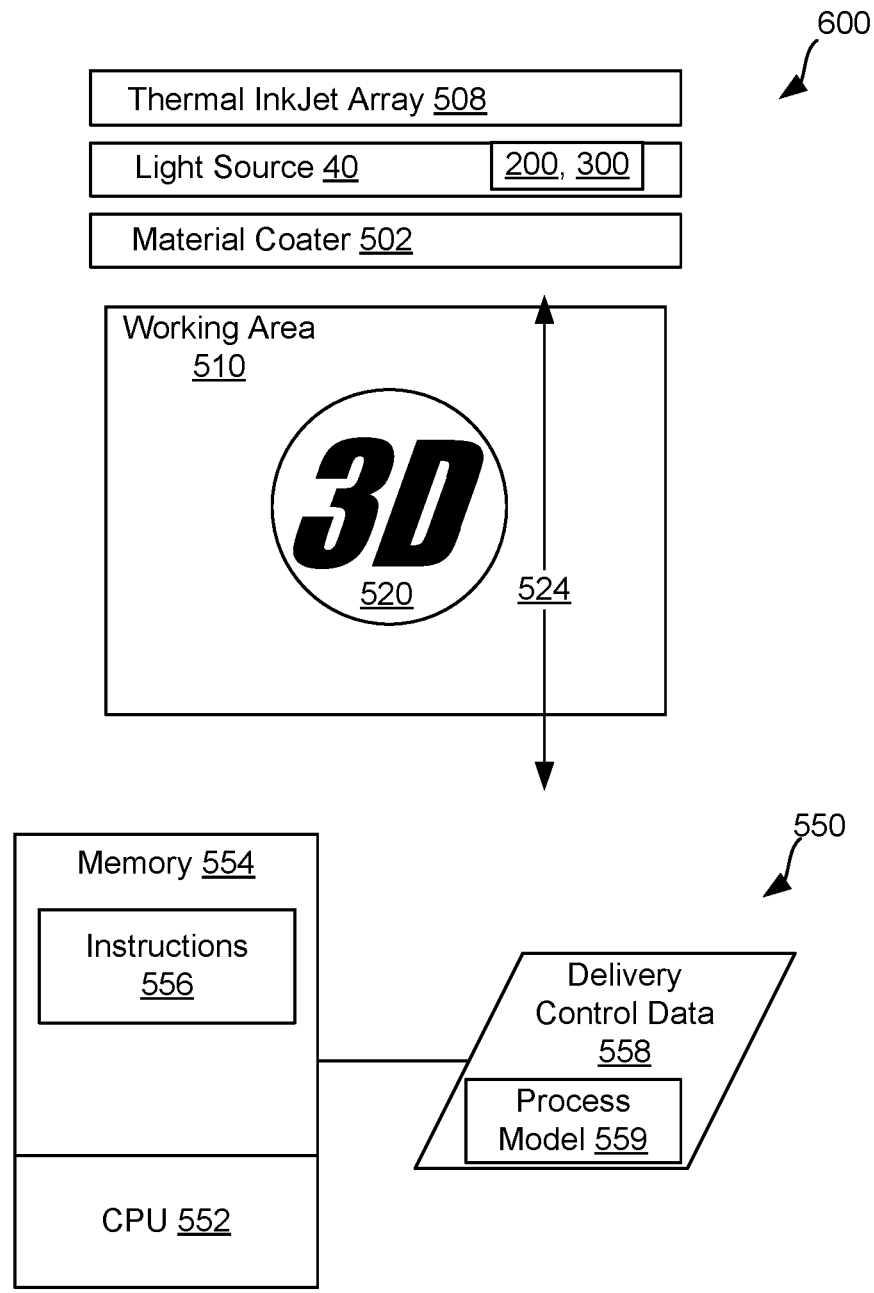

FIG. 6 is another example of a 3D printing system 600 in which the thermal inkjet array 508, the light source 40 (including at least one of the reflector assemblies 200, 300), and the material coater 502 all traverse a single axis along second direction 524. The thermal inkjet array 508, light source 40 and material coater 502 may be attached to one or more independent carriages for movement back and forth the axis along second direction 524. This configuration results in a more compact and efficient 3D printer design.

Accordingly, A 3D printing system 500, 600 may include a working area 510 to create a 3D object 520. A processor (CPU 552) may be coupled to non-transitory computer readable memory 554 that contains instructions 556 that when read and executed by the processor 552 cause the processor 552 to read delivery control data 558 defining a process model 559 to create the 3D object 520. The processor 552 also may control a material coater 502 to apply a sinterable material 20 in the working area 510. A thermal inkjet array 508 may be used to dispense coalescent dispersions 30 on at least a portion of the sinterable material 20. A light source 40 may expose the sinterable material 20 and the coalescent dispersion 30 thereon to fuse the sinterable material 20. The light source 40 may include a single reflector 202 having at least two elliptical-shaped reflector cavities 210, 212, 214 each with a respective focus point 211, 213, 215 along the length of the single reflector 202. The shape of the single reflector 202 includes two mirror-asymmetric profile partial elliptical-shaped reflector surfaces 210, 214 on each end of the single reflector 202, each having a first side 224, 225 extending to distal ends 230 of distal opening 204, in some examples to a transparent window 304 spanning the distal opening 204, and the first side 224, 225 longer than an opposite second side 226, 227. Any remaining elliptical-shaped reflector cavities 212 have a first side 228 and a second side 229 the same length as the opposite second sides 226, 227 of the two partial elliptical-shaped reflector cavities 210, 214.

In some example implementations, the 3D printing system 500 may have the processor 552 cause the light source 40 to traverse across the working area 510 and the light source 40 provides a pre-heat energy profile, a substantially uniform energy profile, and an anneal profile to the coalescent dispersions 30 on at least a portion of the sinterable material 20.

Variations in the sintering level may be achieved using similar strategies as described above for to allow for gloss and/or color variations. As an example, if it is desirable that the level of sintering decrease along the 3D object 520 is built up, the radiation exposure time may be the highest in the first layer and decrease in subsequently formed layers.

The water-soluble or water-dispersible infrared or near-infrared fusing agent in the coalescent dispersion 30 enhances the absorption of the IR or near-IR energy, converts the absorbed IR or near-IR energy to thermal energy, and promotes the transfer of the thermal heat to the sinterable material 20 in contact with the fusing agent (i.e., in the selected area 24). In an example, the water-soluble or water-dispersible infrared or near-infrared fusing agent sufficiently elevates the temperature of the sinterable material 20 in the selected area 24 above its melting point, allowing curing (e.g., sintering, binding, fusing, etc.) of the sinterable material 20 to take place. The coalescent dispersion 30 may also cause, for example, heating of the sinterable material 22 below its melting point but to a temperature suitable to cause softening and bonding. It is to be understood that area(s) not having the coalescent dispersion 30 applied thereto absorb less energy, and thus the sinterable material 20 within these area(s) generally does not exceed the melting point and does not cure. This distribution of substantially uniform power distribution forms one layer 22 of the 3D object 520 to be formed.

The stages of the process in FIGS. 1A-1D of FIG. 1 may be repeated as many times by 3D print system 500 as desirable to create and ultimately form subsequent layers of 3D object 520. In some examples heat absorbed during the application of energy from a portion of the sinterable material 20 on which coalescent dispersion 30 has been delivered or has penetrated may propagate to a previously solidified layer, such as layer 22, causing at least some of that layer to heat up above its melting point. This effect helps create strong interlayer bonding between adjacent layers of the 3D object 520.

In some examples, any of the subsequently formed layers may have any desirable shape and/or thickness and may be the same as or different from any other layer depending upon the size, shape, etc. of the 3D object 520 that is to be formed.

The water-soluble nature of the fusing agent and the aqueous nature of the coalescent dispersion 30 enable the fusing agent i) to penetrate into a layer of the sinterable material 20, even though the layer may have varying compaction or porosity, and, in some instances, ii) to envelop the surfaces of the sinterable material 20. The sinterable material 20 may be hydrophobic, and the presence of the co-solvent and/or surfactant in the coalescent dispersion 30 may assist in obtaining desirable wetting behavior.

The integration of the fusing agent throughout the portion of the layer upon which the coalescent dispersion 30 is applied enables control over the mechanical functionality (by tweaking the amount of fusing agent and thus controlling the level of sintering, fusing, binding in and between layers) and dimensional accuracy of the layer of the 3D object 520 that is formed.

A single coalescent dispersion 30 may be selectively applied to form the layer of the 3D object 520, or multiple coalescent dispersions 30 may be selectively applied to form the layer of the 3D object 520. In an example in which it is desirable that the entire layer of the 3D object 520 be glossy, a single coalescent dispersion 30 including the gloss enhancing agent may be selectively applied. In this example, gloss will be imparted to both the interior and the exterior of the layer that is formed.

The sinterable material 20 may be a powder, a liquid, a paste, or a gel. Examples of sinterable material 20 include semi-crystalline thermoplastic materials with a wide processing window of greater than 5° C. (i.e., the temperature range between the melting point and the re-crystallization temperature). Some specific examples of the sinterable material 20 include polyamides (e.g., nylon 11, nylon 12, nylon 6, nylon 8, nylon 9, nylon 66, nylon 612, nylon 812, nylon 912, etc.). Other specific examples of the sinterable material 20 include polyethylene, polyethylene terephthalate (PET), and amorphous variation of these materials.

While the claimed subject matter has been particularly shown, and described with reference to the foregoing examples, those skilled in the art will understand that many variations may be made therein without departing from the intended scope of subject matter in the following claims. This description should be understood to include all novel and non-obvious combinations of elements described herein, and claims may be presented in this or a later application to any novel and non-obvious combination of these elements. The foregoing examples are illustrative, and no single feature or element is indispensable to all possible combinations that may be claimed in this or a later application. Where the claims recite "a" or "a first" element of the equivalent thereof, such claims should be understood to include incorporation of one or more such elements, neither requiring nor excluding two or more such elements.

What is claimed is:

1. A 3D printing system, comprising:
a light source to expose a sinterable material and a coalescent dispersion deposited thereon to fuse the sinterable material where the coalescent dispersion is deposited, wherein the light source includes a reflector assembly including a single reflector having at least two elliptical-shaped reflector cavities each with a respective focus point, and the shape of the single reflector includes two partial elliptical-shaped reflector surfaces having mirror-asymmetric profiles on each end of the single reflector each having a first side extending to a distal end and the first side longer than an opposite second side, and wherein any remaining elliptical-shaped reflector cavities have a first side and a second side the same length as the opposite second sides of the two partial elliptical-shaped reflector cavities.

2. The 3D printing system of claim 1, further comprising a set of light tubes, each situated at the respective focus point of each respective reflector cavity, and wherein the shape of the single reflector is to provide substantial uniform power distribution of light from the set of light tubes across a length and a width of the distal ends of the single reflector, and wherein the shape of the single reflector is to provide radiant and thermal isolation between adjacent light tubes.

3. The 3D printing system of claim 1, further comprising:
a transparent window enclosing along a length and a width of the distal ends of the single reflector;
a webbed structure to hold in place the shape of the single reflector and to allow thermal transfer from the single reflector to ambient air surrounding the single reflector; and
a partial metal enclosure sealing on one side the transparent window and wherein the single reflector and the webbed structure are enclosed within the partial metal enclosure.

4. The 3D printing system of claim 3, wherein the partial metal enclosure includes metal fins extending inside towards the single reflector to absorb thermal heat from the ambient air surrounding the single reflector.

5. The 3D printing system of claim 1, wherein the single reflector is formed from a stamped sheet metal with an air gap between adjacent reflector cavities.

6. The 3D printing system of claim 1, further comprising:
a working area to create a 3D object,
a material coater to apply a sinterable material in the working area;
a thermal inkjet array to dispense coalescent dispersions on at least a portion of the sinterable material; and
a processor coupled to non-transitory computer readable memory containing instructions that when read and executed by the processor cause the processor to read delivery control data defining a process model to create the 3D object and control the material coater and the thermal inkjet array.

7. The 3D printing system of claim 6, wherein the processor causes the light source to traverse across the working area and the light source provides a pre-heat energy profile, a substantially uniform energy profile, and an anneal profile to the coalescent dispersions on at least a portion of the sinterable material.

* * * * *